(12) United States Patent
Li

(10) Patent No.: US 8,760,578 B2
(45) Date of Patent: Jun. 24, 2014

(54) QUALITY ASSESSMENT OF HIGH DYNAMIC RANGE, VISUAL DYNAMIC RANGE AND WIDE COLOR GAMUT IMAGE AND VIDEO

(75) Inventor: Zhen Li, Cupertino, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 13/640,575

(22) PCT Filed: Apr. 19, 2011

(86) PCT No.: PCT/US2011/032982
§ 371 (c)(1),
(2), (4) Date: Oct. 11, 2012

(87) PCT Pub. No.: WO2011/133505
PCT Pub. Date: Oct. 27, 2011

(65) Prior Publication Data
US 2013/0027615 A1    Jan. 31, 2013

Related U.S. Application Data

(60) Provisional application No. 61/325,614, filed on Apr. 19, 2010.

(51) Int. Cl.
*H04N 5/14* (2006.01)

(52) U.S. Cl.
USPC ........... 348/571; 348/575; 348/580; 348/581; 348/582; 382/276

(58) Field of Classification Search
USPC .................... 348/557, 580, 582; 345/591
See application file for complete search history.

(56) References Cited

U.S. PATENT DOCUMENTS 5,394,483 A    2/1995  Daly
6,360,022 B1 *  3/2002  Lubin et al. ............... 382/260
(Continued)

FOREIGN PATENT DOCUMENTS

EP    1294199        3/2003
EP    1294199 A1 *   3/2003
(Continued)

OTHER PUBLICATIONS

Wang et al, Image Quality Assessment: From Error Visibility to Structural Similarity, IEEE Transaction on Image Processing, vol. 13, No. 4, Apr. 2004, pp. 600-612.*

(Continued)

*Primary Examiner* — Jefferey Harold
*Assistant Examiner* — Humam Satti
(74) *Attorney, Agent, or Firm* — Fish & Richardson P.C.

(57) ABSTRACT

Assessing a visual quality characteristic includes accessing and processing at least a first image or video signal and a second image or video signal and processing the accessed images or video signals. Based at least in part on processing the accessed images or video signals, a difference is measured between the processed at least first and second images or video signals. The visual quality characteristic relates to a magnitude of the measured difference between the processed at least first and second images or video signals. The at least first and second images or video signals include a high or visual dynamic range and/or a wide color gamut. The visual quality characteristic is assessed based, at least in part, on the measured difference.

29 Claims, 9 Drawing Sheets

(56) References Cited

U.S. PATENT DOCUMENTS

| | | | |
|---|---|---|---|
| 6,654,504 B2 | 11/2003 | Lubin | |
| 6,678,424 B1 | 1/2004 | Ferguson | |
| 6,690,839 B1* | 2/2004 | Ferguson | 382/274 |
| 6,907,143 B2 | 6/2005 | Ferguson | |
| 6,941,017 B2 | 9/2005 | Ferguson | |
| 7,305,144 B2 | 12/2007 | Fattal | |
| 7,545,985 B2 | 6/2009 | Zhang | |
| 7,590,287 B2 | 9/2009 | Lu | |
| 8,238,688 B2* | 8/2012 | Chen et al. | 382/274 |
| 8,265,378 B2 | 9/2012 | Whitehead | |
| 8,346,009 B2* | 1/2013 | Zhai et al. | 382/274 |
| 2004/0175056 A1 | 9/2004 | Lee | |
| 2005/0259153 A1* | 11/2005 | Oka | 348/189 |
| 2005/0281333 A1 | 12/2005 | Ghanbari | |
| 2006/0104533 A1 | 5/2006 | Daly | |
| 2006/0152585 A1 | 7/2006 | Bourret | |
| 2006/0268980 A1 | 11/2006 | Le Dinh | |
| 2006/0279633 A1* | 12/2006 | Oka | 348/187 |
| 2007/0088516 A1 | 4/2007 | Wolf | |
| 2007/0257988 A1 | 11/2007 | Ong | |
| 2008/0025400 A1 | 1/2008 | Sugimoto | |
| 2008/0106647 A1* | 5/2008 | Kimura et al. | 348/607 |
| 2009/0027558 A1* | 1/2009 | Mantiuk et al. | 348/673 |
| 2009/0046207 A1* | 2/2009 | Salvucci | 348/663 |
| 2009/0060027 A1 | 3/2009 | Ferguson | |
| 2009/0116713 A1 | 5/2009 | Yan | |
| 2009/0161945 A1* | 6/2009 | Morgan-Mar et al. | 382/154 |
| 2009/0273677 A1 | 11/2009 | Huynh-Thu | |
| 2011/0194618 A1 | 8/2011 | Gish | |
| 2011/0316973 A1* | 12/2011 | Miller et al. | 348/43 |

FOREIGN PATENT DOCUMENTS

| | | |
|---|---|---|
| EP | 1947609 | 7/2008 |
| EP | 2077527 | 7/2009 |
| WO | 9830979 | 7/1998 |
| WO | 2008048155 | 4/2008 |
| WO | 2009091530 | 7/2009 |

OTHER PUBLICATIONS

Banterle, F., et al. "High Dynamic Range Imaging and Low Dynamic Range Expansion for Generating HDR Content" 2009, Computer Graphics Forum, vol. 28, No. 8, pp. 2343-2367.

Guarnieri, G. et al., "NonLinear Mapping of the Luminance in Dual-Layer High Dynamic Range Displays" Proc. of the SPIE—The International Society for Optical Engineering, v 7245, Conference: Image Processing: Algorithm and Systems, Jan. 19-22, 2009, San Jose.

Liu, M. et al., "Image Quality Assessment Using Contourlet Transform" Optical Engineering, v 48, No. 10, 2009.

Richter, T. "On the mDCT-PSNR Image Quality Index" International Workshop on Quality of ultimedia Experience, 2009, published by IEEE, NJ, USA.

Ndjiki-Nya, P. et al., "Efficient Full-Reference Assessment of Image and Video Quality" Proc. International Conference on Image Processing, v. 2, pp. II125-II28, Sep. 16-19, 2007.

Ivkovic, G. et al., "An Algorithm for Image Quality Assessment" Acoustics, Speech, and Signal Processing, 2004, vol. 3, pp. 713-716.

Wang, Z. et al., "Mean Squared Error: Love it or Leave it?" IEEE Signal Processing Magazine, Jan. 2009, pp. 98-117.

Mantiuk, D. et al. "Predicting Visible Differences in High Dynamic Range Images—Model and Its Calibration" Proceedings of Human Vision and Electronic Imaging X, IS & T/SPIE 17th Annual Symposium on Electronic Imaging 2005, pp. 204-214.

Poynton, C. "Digital Video and HDTV: Algorithms and Interfaces" Morgan Kaufman Publishers, 2004.

ITU709 "Parameters Values for the HDTV Standards for Production and International Programme Exchange" Recommendation ITU-R, BT.709-5, (Apr. 2002).

Reinhard, E. et al., "Photographic Tone Reproduction for Digital Images" Proc. of Siggraph 2002, ACM Trans. Graphics, 21(3), 267-276, Aug. 2002.

Reinhard, E., "High Dynamic Range Imaging: Acquisition, Display, and Image-Based Lighting", Morgan Kauffmann Publishers, San Francisco, 2005.

Wang, Z. et al., "Image Quality Assessment: from Error Visibility to Structural Similarity" IEEE Transactions on Image Processing, vol. 13, No. 4, pp. 600-612, Apr. 2004.

Caron B. "Facility for Subjective Evaluation of Advanced Television in North America" Television Measurements, 1991, Fourth International Conference on Montreux, Switzerland, London, Jan. 1, 1991, p. 8.

Notification of Transmittal of the International Search Report and the Written Opinion of the International Searching Authority, or the Declaration issued in PCT/US2011/032982 on Sep. 22, 2011, 12 pages.

* cited by examiner

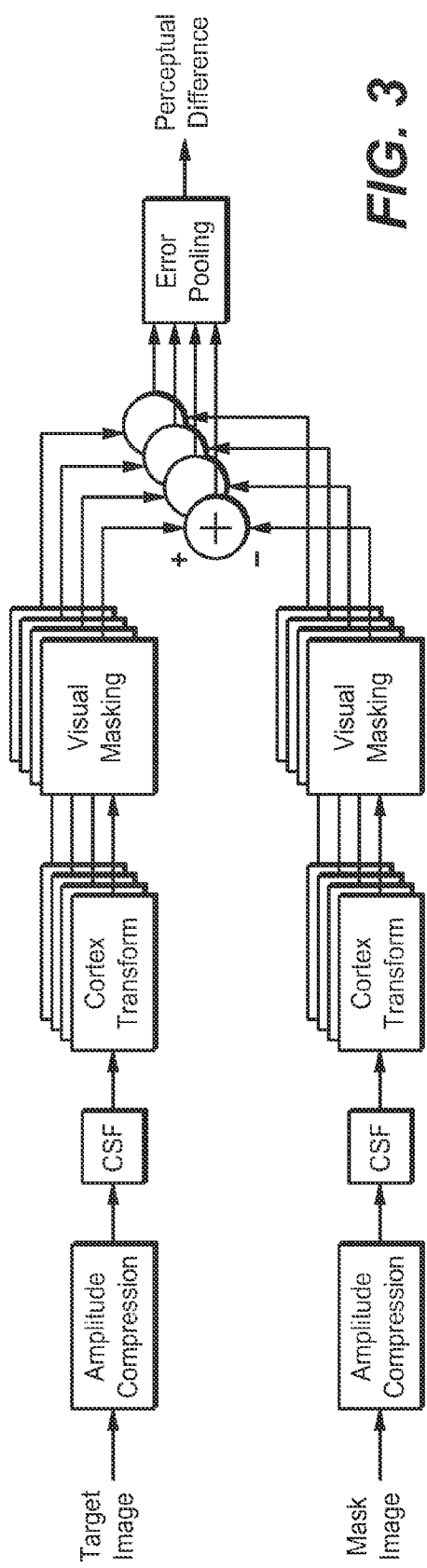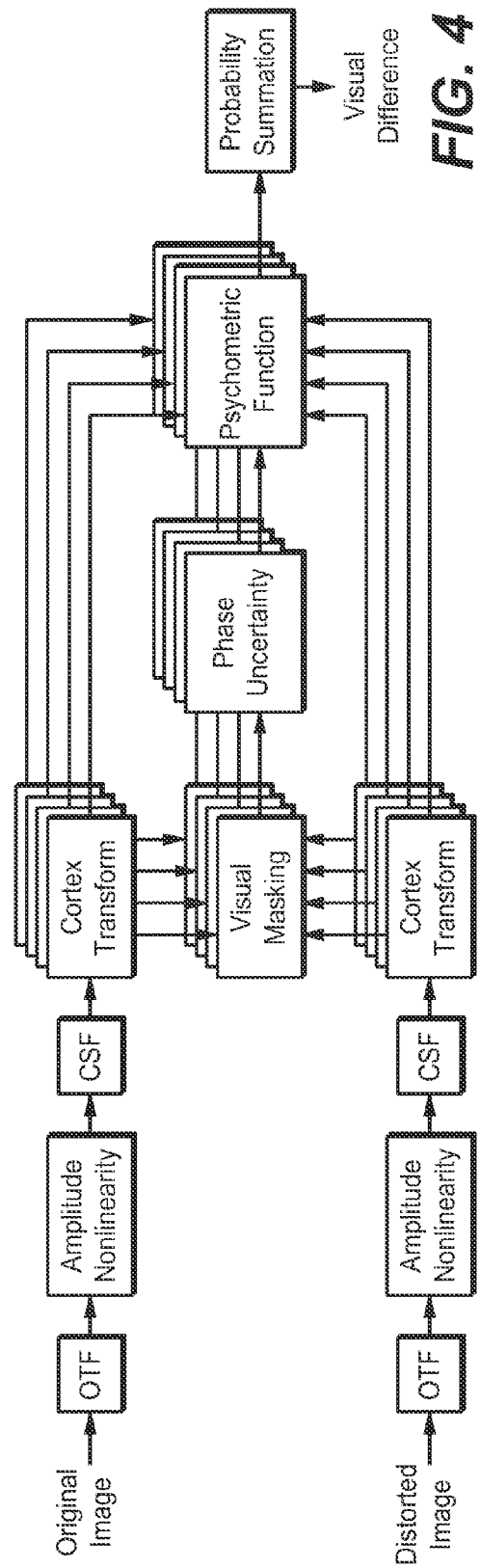

QUALITY ASSESSMENT OF HIGH DYNAMIC RANGE, VISUAL DYNAMIC RANGE AND WIDE COLOR GAMUT IMAGE AND VIDEO

CROSS-REFERENCE TO RELATED APPLICATIONS

This application claims priority to U.S. Patent Provisional Application No. 61/325,614, filed 19 Apr. 2010, hereby incorporated by reference in its entirety.

TECHNOLOGY

The present invention relates generally to image and video quality assessment. More particularly, an embodiment of the present invention relates to quality assessment of high dynamic range, visual dynamic range, and wide color gamut image and video.

BACKGROUND

High Dynamic Range, Visual Dynamic Range, and Wide Color Gamut

As used herein, the term dynamic range may relate to the range of luminance (e.g., intensity) in an image. The dynamic range in real-world scenes is large. Different image and video applications in use today for the capture, representation, and presentation of image and video signals may have different dynamic ranges. For example, photographic negatives can have a relatively large dynamic range, while photographic prints, some currently existing (e.g., conventional) television (TV) sets and computer monitors may have a smaller dynamic range.

As used herein, the term "low dynamic range" (LDR) may relate to the dynamic range associated with many current TVs or monitor displays. In contrast to LDR images, high dynamic range (HDR) images contain essentially all of the dynamic range in an original scene on which the HDR image is based. LDR images are typified by the images rendered with the 8-bit displays in widespread use today. HDR images may be rendered with 10-14 bit displays.

For a number of applications such as compression for distribution and display, encoding HDR may not be necessary and may in fact be somewhat computationally expensive and/or bandwidth consumptive. However, for some of these modern applications, LDR images may simply not suffice for all purposes. Instead, such applications may more advantageously use, create, store, transmit or render images that may be characterized by a Visual Dynamic Range (VDR). VDR images encompass essentially all of the luminance and color that a typical human visual system (HVS) can simultaneously perceive (e.g., visually perceive at any given time).

Background FIG. 1 depicts a comparison between the entire range of human-visible luminance (e.g., HDR, shown with the center "adaptation range" arrow), with the range of luminance simultaneously visible (e.g., VDR, shown in the upper "simultaneous visual" range arrow), and the range of a typical 8-bit gamma-mapped display (e.g., LDR, shown in the lower "devices" range arrow). FIG. 1 thus depicts a comparison between HDR, VDR, and LDR, as background information that may be relevant to an embodiment of the present invention.

As used herein, the term color gamut may relate to a certain subset of colors. Color gamuts are commonly represented as areas within the CIE 1931 chromaticity diagram, which is familiar to artisans skilled in fields related to color, images, video, displays, cinematography and photography (e.g., "color, image and video"). Artisans skilled in these fields realize that a more-or-less "horseshoe" shaped region of the CIE 1931 chromaticity diagram represents is the entire range of possible chromaticities.

For any display device however, there are physical limits to the set of colors that can be reproduced or displayed. For example, existing display devices such as a cathode ray tube (CRT), liquid crystal display (LCD), or plasma display typically cover only a relatively small area in the entire color space. With reference to the CIE 1931 chromaticity diagram, artisans skilled in the color, image and video fields recognize that the color gamut available in most conventional devices may be represented as a triangle shape, within the entire, significantly (e.g., substantially) larger horseshoe shape area of the CIE 1931 chromaticity diagram, which represents an entire range of possible chromaticities that may exist.

Certain colors that cannot be displayed, rendered or reproduced within a particular color model may be referred to herein as out of gamut. Additional processing is typically needed to handle, reproduce and display these colors. Such additional processing may be referred herein to as gamut mapping. As used herein, the term wide color gamut (WCG) may relate to a color gamut that encompasses more color than the devices delimited to the smaller triangle within the horseshoe shape of the CIE 1931 chromaticity diagram and, essentially at a limit, all the colors that the HVS is capable of perceiving. Background FIG. 2 depicts an example grey scale representation of this chromaticity diagram, which should be familiar to artisans skilled in fields relating at least to images, color, video, cinema, photography and the like.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 depicts an example of VDP, with which an embodiment of the present invention may be practiced;

FIG. 4 depicts an example extension of a VDP metric to an HDR space, with which an embodiment of the present invention may be practiced;

DESCRIPTION OF EXAMPLE EMBODIMENTS

Figure 1:
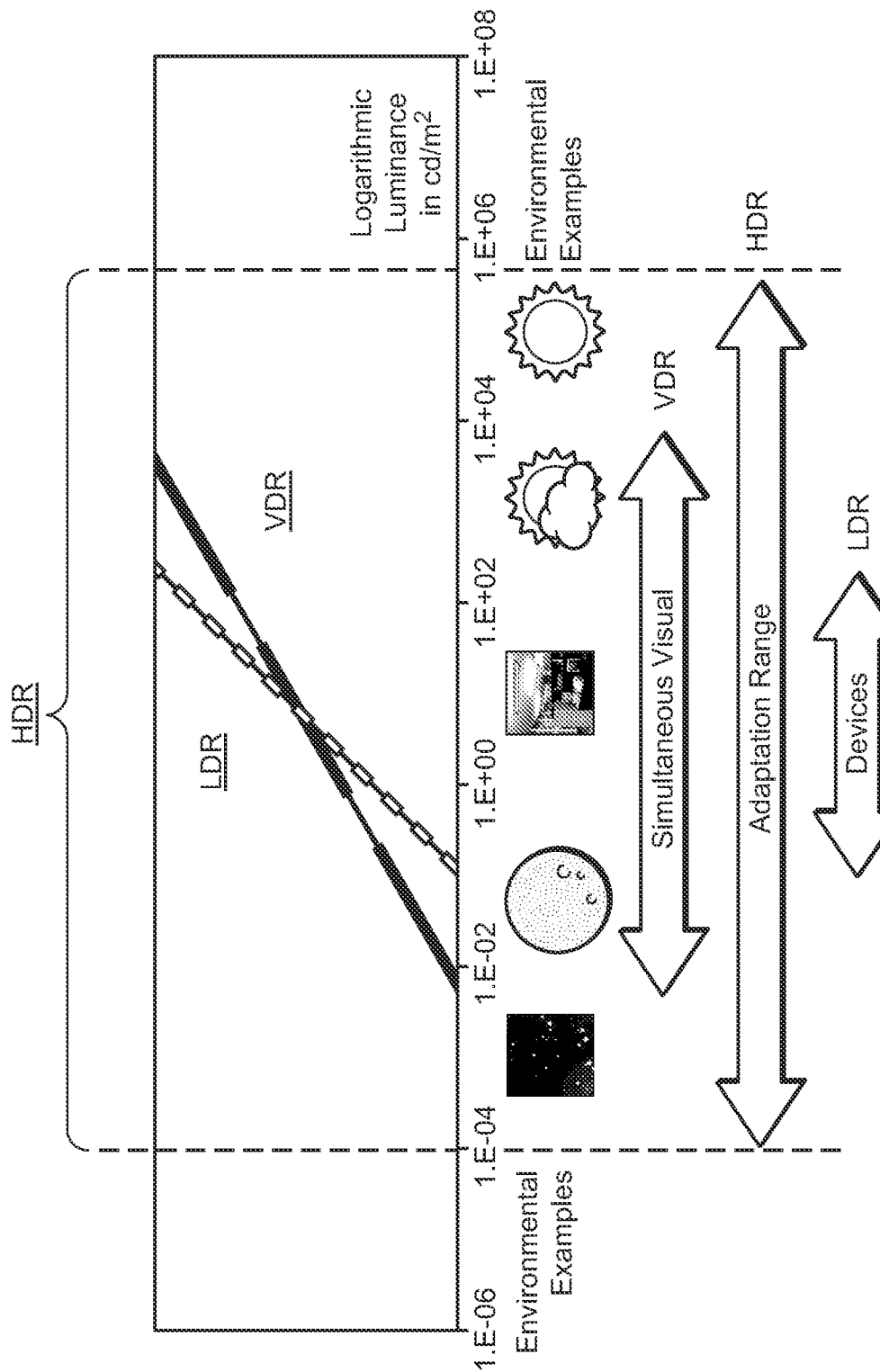
FIG. 1 depicts a comparison between HDR, VDR, and LDR, as background information that may be relevant to an embodiment of the present invention.
Figure 2:
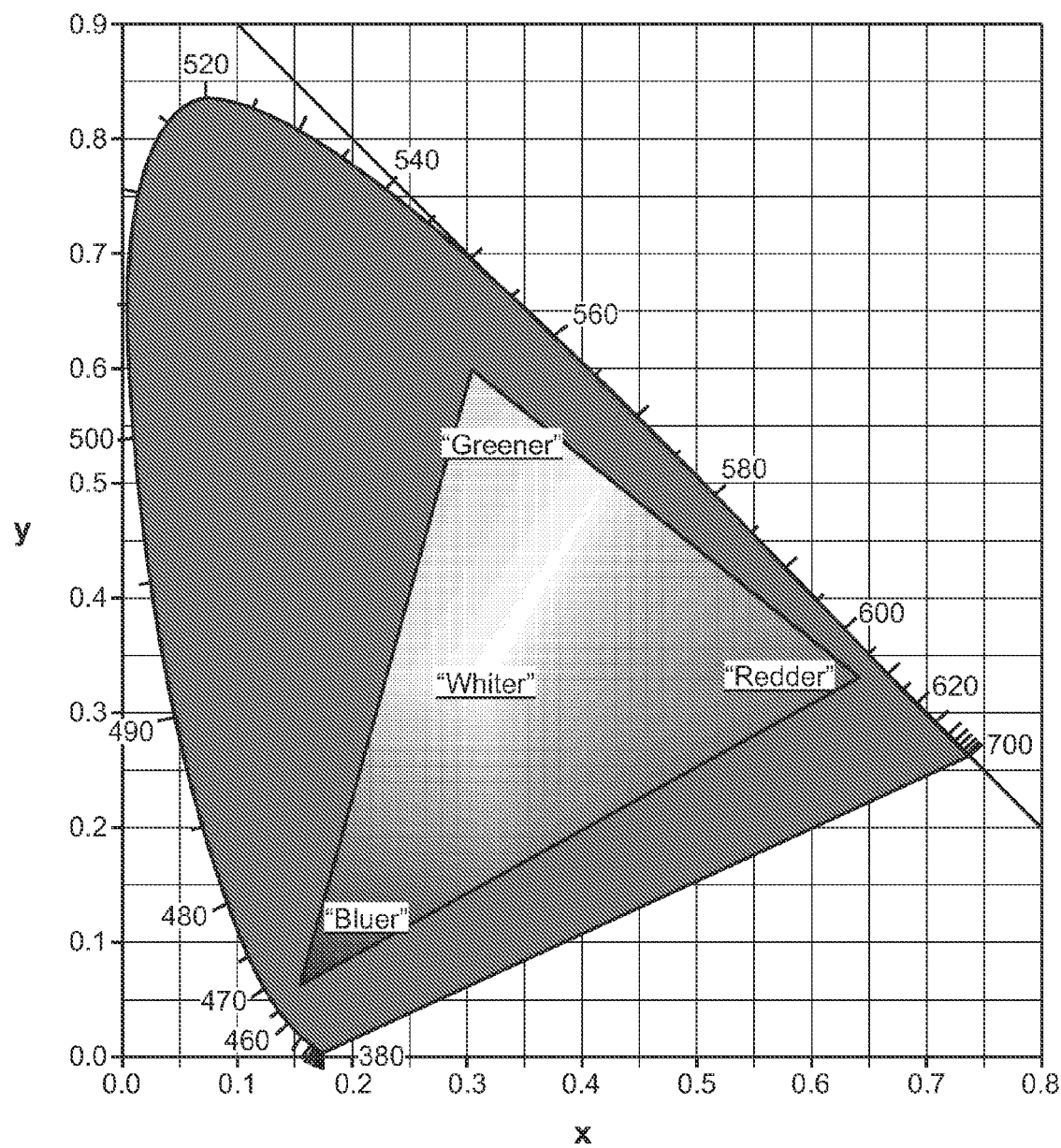
FIG. 2 depicts an example grey scale representation of a chromaticity diagram, as background information that may be relevant to an embodiment of the present invention.

Quality assessment of high dynamic range, visual dynamic range, and wide color gamut image and video is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to quality assessment of high dynamic range, visual dynamic range, and wide color gamut image and video. Assessing a visual quality characteristic includes accessing and processing at least a first image or video signal and a second image or video signal. Based at least in part on processing the accessed images or video signals, a difference is measured between the processed at least first and second images or video signals. The visual quality characteristic relates to a magnitude of the measured difference between the processed at least first and second images or video signals.

The at least first and second images or video signals include a dynamic range and/or a color gamut. The visual quality characteristic is assessed based, at least in part, on the measured difference. The dynamic range includes a visual dynamic range (VDR) and/or a high dynamic range (HDR) and the color gamut comprises at least one of an extended color gamut or a wide color gamut (WCG).

It should be appreciated that the techniques described herein, while described in relation to at least a first and a second image or video signal, may be applied over more than two images or video signals. While descriptions herein may refer to images or to video signals or to both, it should also be appreciated a reference to either term is meant to describe both terms (unless a particular description or portion thereof expressly states to the contrary in that particular case).

An embodiment reports the measured difference between the processed at least first and second images or video signals, such as with an output of a visual quality assessment based on the measured difference between the processed first and second images or video signals. The reported measured difference between the processed first and second images or video signals may include numerical data that is related to the measured difference between the processed first and second images or video signals and/or a map that represents the measured difference between the processed first and second images or video signals. The difference map represents the measured difference between the processed at least first and second images or video signals in a graphical format. The graphically formatted map represents the measured difference between the processed at least first and second images in one or more of a correspondence to or a registration with the at least first and second images. An embodiment marks the measured differences between the processed first and second images or video signals. Thus, the difference map represents the marked measured differences in a spatial conformation with the first and second images or video signals.

In an embodiment, at least one of the first and second images or video signals comprises a target image, for which the visual quality characteristic is assessed. Thus, at least a second of the images or video signals comprises a reference image. The visual quality characteristic is assessed for the target image with a comparison to the reference image.

In an embodiment, processing the accessed images or video signals includes computing one or more components of the at least first and second images or video signals according to a plurality of related parameterized functions. In an embodiment, computing the components of the first and second images or video signals according to a plurality of related parameterized functions includes computing a photographic mapping. Components of the first and second images or video signals relate to a brightness characteristic (e.g., intensity, luminance, luma) or a color characteristic (e.g., chrominance, chroma) of the first and second images or video signals.

The dynamic range and/or the color gamut of an embodiment respectively comprise a first dynamic range or a first color gamut. Processing the accessed images or video signals includes transforming a color space associated with the at least first and second images or video signals. The color space may be transformed from a first dynamic range to at least a second dynamic range. Additionally or alternatively, the color space may be transformed from a first color gamut to at least a second color gamut.

Transforming the color space may include converting multiple first non-linear values that are associated with the first dynamic range and/or the first color gamut to multiple second values that have essentially linear characteristics. The second values are scaled according to a non-linear scaling factor, which corresponds to a perceptual non-uniformity that may be associated with the conversion from non-linear values to essentially linear values. The first non-linear values may be associated with a gamma encoded RGB signal. Thus, converting to the essentially linear values may include an undoing or reversing the gamma encoding associated with the RGB signal. Non-linear scaling may be applied over the brightness related component and/or the color characteristic of the first and second images or video signals. Upon scaling the brightness related component and/or the color characteristic, the difference between the first and second images may be measured according to the scaled brightness related component and/or the scaled color characteristic. The essentially linearized RGB signal may comprise an XYZ color space. An embodiment may convert the XYZ color space into a scaled RGB color space and encode the scaled RGB color space with a gamma value. The difference between the first and second images or video signals may be measured according to the gamma encoded scaled RGB color space.

In an embodiment, measuring the difference between the processed first and second images or video signals includes measuring a structural similarity index (SSIM) value between them. Measuring the structural similarity index value may include comparing a value that relates to an image intensity (e.g., brightness), a contrast and a structure. The intensity, contrast and structure are associated with the first and second images or video signals.

The first and second video signals may include multiple frames, slices, and/or fields. An embodiment measures the difference for each of the frames, slices and/or fields as an individual difference, further processes the measured individual differences, and generates an overall difference value for the video sequence that comprises the plurality of frames, slices or fields.

An embodiment may execute, perform, or implement these techniques with a variety of systems, video quality assessment apparatus, integrated circuits (IC), including microprocessors, digital signal processors (DSP), configurable or programmable logic devices such as gate arrays (e.g., FPGA) and microcontrollers, and application specific ICs (ASIC).

Example Image and Video Quality Assessment

Assessing attributes that relate to the visual quality of an image or video signals can be significant in image and video applications that may include, but are not limited to capturing, compression, delivery and display of the images or video signals. Quality assessment can be used to benchmark, monitor, adjust and/or optimize a 'quality attribute' (e.g., a characteristic that relates to a subjective or objective perception or measurement of one or more aspects of visual or pictorial excellence, worthiness, accuracy, precision or value) of images and video signals.

In general, image and video quality assessment methodology falls into at least one of subjective or objective assessments of quality. To achieve a subjective quality assessment, a typically large number of human observers visually assess target images and displayed video signals in a controlled environment. Upon assessing the target image or displayed video signals, the human observers are polled as to their decisions, opinions or inclinations relating to the perceptual quality of the observed image and video signals, as perceived by each subject observer. The observers' decisions are then typically further processed to form a Mean Opinion Score (MOS).

The assessment opinions established by subjective quality assessment are generally considered as a significant "ground truth" indicator. However, subjective quality assessment typically demands a significant investment of time and expense to complete. Moreover, subjective quality assessments may sometimes be essentially impractical for some applications. Applications for which subjective quality assessments may sometimes be essentially impractical may include, but are not limited to image and video process (e.g., algorithm) optimizations, which may benefit, at least in part, from real-time assessment feedback.

In situations for which real-time assessment feedback may be beneficial, objective quality assessments may be a more appropriate approach than subjective assessment. Objective quality assessment evaluates the target image or video signal and forms (e.g., measures, generates, outputs or promulgates) a visual quality related analysis or report in relation to the visual quality of the image or signal. Objective quality assessments typically strive to achieve assessment values or scores that match or approximate as closely as possible to reliable or dependable corresponding subjective quality assessments.

Objective quality assessments may be classified as at least one of three classes: (1) full-reference, (2) reduced-reference, or (3) no-reference objective quality assessments. Full-reference (FR) assessments use a complete reference image, which is assumed available for comparison with target images. Reduced-reference (RR) quality assessments are made with partially available the reference images, such as in the form of extracted features (e.g., "media fingerprints," other hash-related signatures, or metadata. No-reference (NR) quality assessments are made where no reference image is known or available. NR and RR objective quality assessments are typically difficult to efficiently, quickly and economically achieve. An embodiment of the present invention relates to full-reference (FR) image quality assessment.

FR objective quality assessment (OQA) may be made according to one or more optional techniques. Peak Signal-to-Noise Ratio (PSNR) may be used to achieve a FR OQA. PSNR may be derived from the Mean Squared Error (MSE). Given two vectors of length N $x=\{x_i|i=1, \ldots, N\}$ and $y=\{y_i|i=1, \ldots, N\}$, the MSE between x and y and the PSNR may respectively be computed according to Equations 1A and 1B, below.

$$MSE(x, y) = \frac{1}{N}\sum_{i=1}^{N} (x_i - y_i)^2 \qquad (1A)$$

$$PSNR(x, y) = 10\log_{10}\left(\frac{L^2}{MSE(x, y)}\right) \qquad (1B)$$

In Equation 1B, L represents a maximum possible pixel value of the image (for example, for the 8-bit LDR image and video signals between [0, 255], L=255).

MSE and/or PSNR are relatively simple computations. The simplicity of the MSE and PSNR computations are widely used in signal processing, including image and video applications. Moreover, the MSE and PSNR computations may benefit from quadratic representation, which can provide closed-form optimization solutions. However, MSE or PSNR may not always conelate strongly with MOS. An embodiment of the present invention provides a quality assessment that may more reliably conelate with MOS, or otherwise improve reliability over the MSE and PSNR approach.

An embodiment of the present invention emulates the human visual system (HVS) to provide a model that can be used to improve image and video quality assessment over MSE/PSNR (hereinafter sometimes referred to as simply 'PSNR') related approaches. HVS-based objective quality assessment metrics include the Visual Difference Predictor (VDP) and the Just Noticeable Difference (JND) metric. An embodiment uses an HVS model, which accurately describes a mechanism, modality or process with which the human visual system typically perceives visual quality, to make decisions on the visual quality that are statistically similar or comparable to MOS statistics or similar metric, which are considered to be quite reliable.

FIG. 3 depicts an example of VDP, with which an embodiment of the present invention may be practiced. As with some other HVS-based quality assessment methods, the image signals are first scaled. Scaling the image signals accounts for the non-linear response of HVS to luminance, which may be referred to as Amplitude Compression. Filtering that is based, at least in part, on a contrast sensitivity function (CSF) is applied. The CSF filtering account for the relative (e.g., or varying) sensitivity of the HVS to different spatial and temporal frequencies. A cortex transform and visual masking then separate the images into spatial, temporal, and orientation channels and calculate perceived errors in each channel. Finally, the calculated errors in all channels are combined into a single value.

Unfortunately however, HVS-based objective quality assessment methods rely on the HVS, which is highly complex and nonlinear. Moreover, deep, practical understanding of how human vision and visual perception actually work is, at best, in a very early stage of scientific development. Some conventional models of the human vision are based on certain assumptions that characterize the HVS as a linear or quasi-linear model using highly simplified stimuli such as spots, bars, or ramps. Performance metrics associated with these essentially linear or quasi-linear quality assessment metrics, as compared to simpler metrics such as PSNR, is for the most part inconclusive at this time. However, it has been shown that none of these linear or quasi-linear quality assessment metrics is statistically more reliable, despite the significantly higher computational cost and complexity such metrics typically demand. PSNR thus remains a dominant quantitative performance metric for the image and video applications.

Example HDR, VDR, and WCG Image and Video Quality Assessment

PSNR approaches are used in LDR image and video applications. There are in fact few effective alternatives to the PSNR approach in the LDR space. Unfortunately, the performance of MSE/PSNR approaches suffers (e.g., degrades) when applied to HDR and/or VDR images. For some applications with HDR/VDR image and video signals, the performance of PSNR approaches may simply fail to acceptably perform, e.g., at some minimal level or metric of satisfaction. At least a significant reason for this PSNR approach performance issue relates to the relative inability of the human visual system to scale linearly and/or uniformly from very bright areas to very dark areas of an i3mage scene.

Where a total encompassed dynamic range is relatively small, as is the case in the LDR image and video signals, which typically comprise 2-3 orders of magnitude of dynamic range, such nonlinearity or non-uniformity is tolerable, even if imperfect. However, HDR/VDR image and video signals may contain 5-6 or more orders of magnitude of dynamic ranges. With so wide a dynamic range, the impact of such nonlinearity and/or non-uniformity is substantially more significant.

Laying aside temporarily (e.g., ignoring) the perceptual impact (e.g., on or to typical human viewers) and focusing solely on the numerical difference moreover, PSNR approaches tend to over-estimate the differences in high brightness areas, and under-estimate the differences in low brightness areas. For example, a 5 $cd/m^2$ (candela per meter squared, sometimes referred to as "nits") difference is far more obvious when the background is at a 10 $cd/m^2$ luminance than the same difference in the background of 10,000 $cd/m^2$. However, the contribution of the 5 $cd/m^2$ difference, in either background luminance, to PSNR is the same.

FIG. 4 depicts an example extension of a VDP metric to an HDR space, with which an embodiment of the present invention may function. So called 'HDR VDP' comprises a full reference HDR quality assessment metric. In essence, HDR VDP comprises or represents an extension of the VDP metric to the HDR space.

As compared to VDP, 'HDR VDP' is extended over three stages. In a first of the three stages, modeling related to the HVS is performed. To account for the effect of significant (e.g., marked or dramatic) contrast changes in HDR/VDR signals, images may first be filtered with an Optical Transfer Function (OTF). The OTF simulates light scattering in the cornea, lens, and retina of a typical human eye. In comparison to VDP, which typically models a photoreceptor, HDR VDP converts luminance values into a nonlinear space. In the second of the three stages, the non-linear space into which HDR VDP coverts the luminance values is scaled in JND units. In the third of the three stages, CSF models any loss of sensitivity relating to the HDR VDP approach.

Extending HDR VDP (e.g., in comparison to VDP) over the three stages, as well as the addition of the HVS modeling characteristic of the VDP itself, adds significant complexity and computational and other costs. Conventional approaches to HDR VDP may thus be impracticable or essentially unfeasible for relatively large scale implementations. However, such large scale implementations may be useful in applications that include optimizing image and video processes (e.g., image/video algorithm optimizations).

EXAMPLE EMBODIMENTS

An example embodiment of the present invention assesses a visual difference between a first image and/or video signal and a second image and/or video signal, each of which have a high dynamic range (HDR) or a visual dynamic range (VDR), and/or a wide color gamut (WCG). The image and/or video signals are processed and assessed. The output of the assessment is provided in the form of a numerical result or a difference map where the levels of the differences between the first and second image and video signals are marked. In an example embodiment, the HDR, VDR and WCG image and video signals are processed to account for perceptual non-uniformity. In an example embodiment, a visual difference between the processed signals is measured. In an example embodiment, an assessment outcome is generated as an output. The assessment outcome output may be in the form of numerical results and/or a difference map, in which levels of the differences between the first and the second image and video signals are marked. In an example embodiment, a parameterized function family is used to process the HDR, VDR and WCG image and video signals. In an example embodiment, these quality assessment processes are applied to color channels. In an example embodiment, these quality assessment techniques are applied to optimize image and video processes (e.g., algorithm optimizations).

Figure 5:
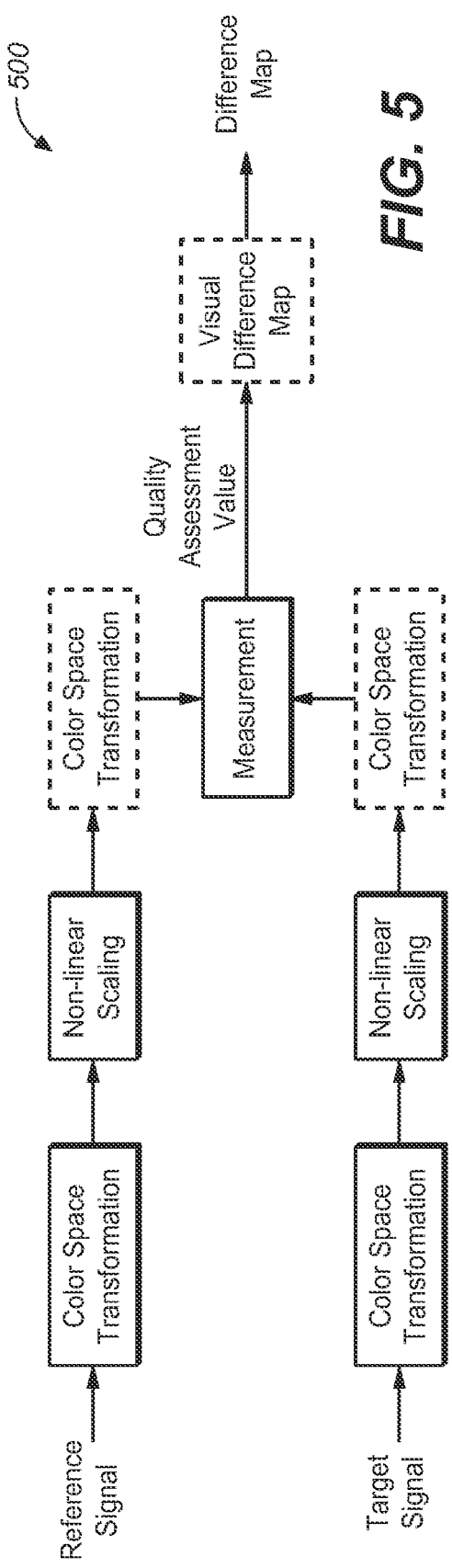
FIG. 5 depicts an example assessment of a visual difference between a pair of HDR, VDR, and WCG image and/or video signals, according to an embodiment of the present invention.

FIG. 5 depicts an example assessment of a visual difference between a pair of HDR, VDR, and WCG image and video signals, according to an embodiment of the present invention. A first signal represents a reference signal, e.g., of a known, standard, or reference-level visual quality. A second signal represents a target signal, the visual quality of which is assessed in relation to that of the reference signal. Note that in the context of the last two sentences, the terms "first" and "second" relate to identifiably distinguishing, labeling or naming the reference and target signals, and are expressly not used in an ordinal or temporal sense (e.g., which otherwise would imply that a reference signal precede a target signal in time or order).

As used in FIG. 5, blocks that are depicted as bounded with dotted lines comprise optional components of a system in an embodiment. The signals are first transformed to an HDR/VDR compatible color space. Non-linear scaling is then applied to the color transformed signals, to account for the perceptual non-uniformity before the measurement is taken. The assessment result can be represented by numerical values or visualized with difference maps.

Figure 6:
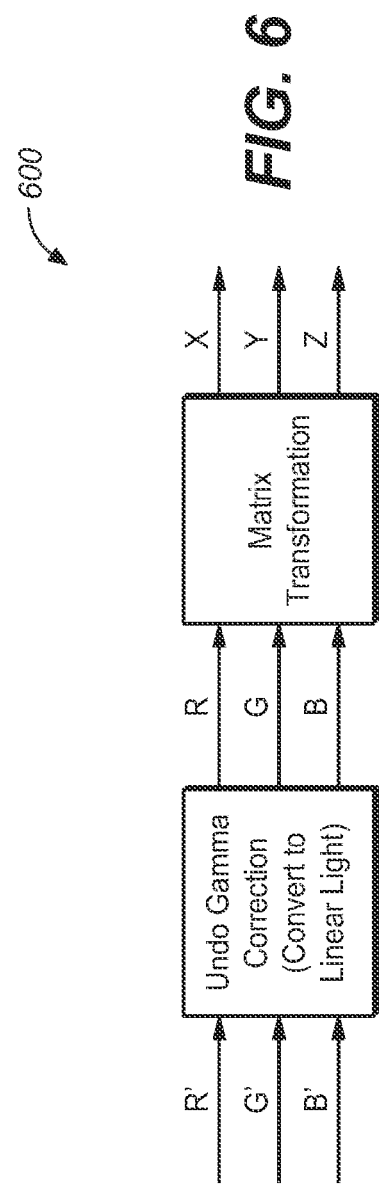
FIG. 6 depicts a gamma encoded RGB signal that is transformed to an example HDR/VDR color space, with which an embodiment of the present invention may be implemented.

The reference signal is first transformed to the HDR/VDR compatible color space. The CIE 1931 XYZ color space, known to artisans skilled in fields relating to color science, colorimetrics, images, video, photography and the like, comprises or represents an example HDR/VDR color space. FIG. 6 depicts a gamma encoded RGB signal that is transformed to an example HDR/VDR color space, with which an embodiment of the present invention may be implemented.

In an embodiment, converting the gamma encoded RGB signal into an HDR/VDR color space commences with reversing the gamma encoding. Gamma encoding may be undone to obtain essentially linear RGB values. Such linear RGB values may be transformed over one or more matrices, which may be known to those artisans skilled in field relating to color science, colorimetrics, images, video, photography and the like, to produce the CIE XYZ tri-stimulus values. An example conversion matrix, from (R, G, B) tri-stimulus values to the (X, Y, Z) tri-stimulus values is defined by the International Telecommunications Union (ITU) Recommendation ITU-R BT.709 according to Equation 2A, below.

$$\begin{bmatrix} X \\ Y \\ Z \end{bmatrix} = \begin{bmatrix} 0.412424 & 0.357579 & 0.180464 \\ 0.212656 & 0.715158 & 0.072186 \\ 0.019332 & 0.119193 & 0.950444 \end{bmatrix} \begin{bmatrix} R \\ G \\ B \end{bmatrix} \quad (2A)$$

An embodiment then applies a nonlinear scaling to the luminance related value, Y. The nonlinear scaling helps account for perceptual non-uniformity that may occur upon the color space transformation. Scaling may not be restricted to the luminance component Y. An embodiment applies scaling in the color channels, which enables color gamut mapping. For example, the nonlinear scaling on Y can be represented with a parameterized family of functions F as computed according to Equations 2B, below.

$$Y_d = \sum_{n=0}^{N-1} f_n(Y) \quad (2B)$$

$$\vec{F} = \{f_0, f_1, \ldots, f_{n-1}\}$$

In Equations 2B, the expression $f_i(\bullet)$ represents a function of the HDR/VDR luminance value Y.

Figure 7:
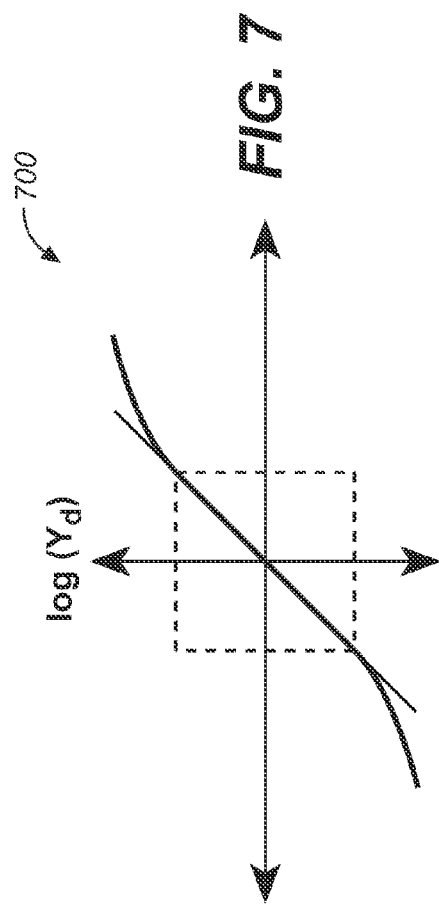
FIG. 7 depicts a representation of an example non-linearly scaled HDR/VDR luminance value, according to an embodiment of the present invention.

An embodiment then applies a nonlinear scaling to the luminance related value, Y. FIG. 7 depicts a representation of an example non-linearly scaled HDR/VDR luminance value, according to an embodiment of the present invention. The nonlinear scaling helps account for perceptual non-uniformity that may occur upon the color space transformation.

Current modeling of human visual system is complex and in some ways, at least partially inaccurate. An embodiment however uses a model that is based, at least in part, on photographic mapping, for example as computed with Equation 3A, below. Photographic mapping according to an embodiment, while simple, effectively scales the dynamic range while maintaining high contrast details in the very bright and very dark areas. In Equation 3 below $$L = \frac{a}{\bar{Y}} \cdot Y,$$

wherein $\bar{Y}$ represents the log-average luminance associated with a scene, and a denotes a parameter that represents a key for the scene. An embodiment may be implemented wherein the default key value a comprises a value that approaches or approximates 18%, which corresponds to a conventional middle-grey value. Equation 3A thus computes the scaled value as $$L_d = \frac{L \cdot \left(1 + \frac{L}{L_{white}^2}\right)}{1 + L} \quad (3A)$$

wherein the expression $L_{white}$ represents a smallest luminance value that will be mapped to "pure white." An embodiment then converts the nonlinearly scaled signal to more linear XYZ tri-stimulus values according to Equations 3B, below.

$$Y_d = L_d \quad (3B)$$

$$X_d = \max\left(0, \frac{L_d}{Y} X\right)$$

$$Z_d = \max\left(0, \frac{L_d}{Y} Z\right)$$

An embodiment uses the XYZ tri-stimulus values computed as Equation 3A, or alternatively (or additionally) uses another color. For example, an embodiment further converts the XYZ tri-stimulus values to the RGB color space and gamma encodes the result, as computed with Equation 3C, below.

$$\begin{bmatrix} R_d \\ G_d \\ B_d \end{bmatrix} = \begin{bmatrix} 3.240708 & -1.537259 & -0.498570 \\ -0.969257 & 1.875995 & 0.041555 \\ 0.055636 & -0.203996 & 1.057069 \end{bmatrix} \begin{bmatrix} X_d \\ Y_d \\ Z_d \end{bmatrix} \quad (3C)$$

$$R'_d = 255 * R_d^{1/\gamma}$$

$$G'_d = 255 * G_d^{1/\gamma}$$

$$B'_d = 255 * B_d^{1/\gamma}$$

In Equations 3C, the exponential expression γ represents a selected gamma value. Assessments may thus be performed over the gamma-encoded RGB space. A similar (e.g., essentially identical) process may be applied to the3 target signal.

The two processed signals are then compared in a measurement unit to determine a visual difference. The measurement can be based on existing or new quality measurement methods. For example, an embodiment may be implemented with a Structural SIMilarity Index (SSIM) based measurement. The SSIM, in contrast to PSNR approaches (which only measures the mean square difference between the two signals), includes three separate components: (1) intensity comparison, (2) contrast comparison, and (3) structure comparison. The three separate components account well for visual differences in HDR/VDR signals. Moreover computing SSIM, while perhaps somewhat more complex than PSNR approaches, achieves efficiencies that exceed HVS-based metrics such as VDP or JND.

Figure 8:
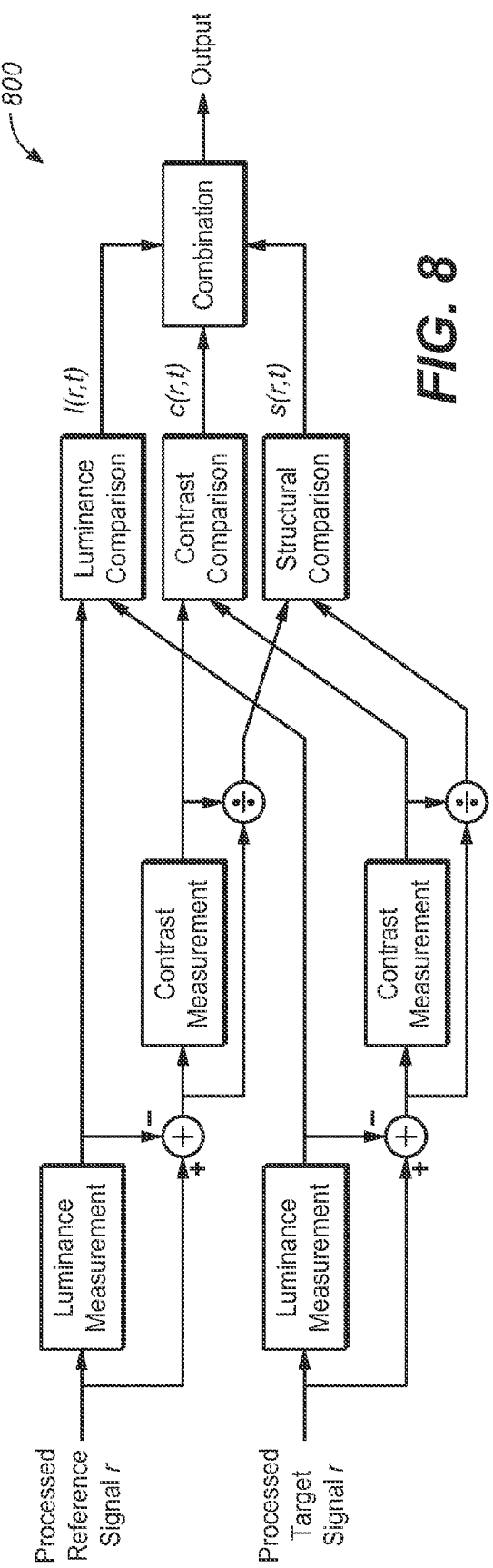
FIG. 8 depicts an example comparison of signal intensities, according to an embodiment of the present invention.

FIG. 8 depicts an example comparison of signal intensities, according to an embodiment of the present invention. The signal that is transformed and scaled signal from the reference signal is represented with the expression r. The signal that is transformed and scaled signal from the target signal is represented with the expression t. An intensity of these two signals is compared and a measurement of the comparison l(r,t) is computed. The mean intensity is removed from the signal and the standard deviations of the resulting signals are compared, with which an estimate is computed that relates to the signal contrast difference c(r,t). An embodiment normalizes the signals, such that the compared signals each have a unit standard deviation. An embodiment compares the normalized signals to indicate a value that relates to the structural difference s(r,t). An embodiment combines the three indicators, which effectively computes an overall quality measure of the two input signals. An embodiment computes a combined quality assessment Q(r, t) according to the expression $$Q(r,t) = [l(r,t)]^\alpha \cdot [c(r,t)]^\beta \cdot [s(r,t)]^\gamma$$

in which α>0, β>0, and γ>0 comprise parameters that are used to adjust the importance of these three components and $$l(r,t) = \frac{2\mu_r\mu_t + C_1}{\mu_r^2 + \mu_t^2 + C_2}, \; c(r,t) = \frac{2\sigma_r\sigma_t + C_2}{\sigma_r^2 + \sigma_t^2 + C_2},$$

$$s(r,t) = \frac{\sigma_{rt} + C_3}{\sigma_r\sigma_t + C_3}$$

in which $\mu_r$ and $\mu_t$ represent the local sample means of r and t, $$\mu_r = \frac{1}{N}\sum_{i=1}^{N} r_i, \; \mu_t = \frac{1}{N}\sum_{i=1}^{N} t_i$$

in which N represents the size of the samples, and $\sigma_r$ and $\sigma_t$ represent the local sample standard deviations of r and t, and $$\sigma_r = \left(\frac{1}{N-1}\sum_{i=1}^{N}(r_i - \mu_r)^2\right)^{1/2}, \; \sigma_t = \left(\frac{1}{N-1}\sum_{i=1}^{N}(t_i - \mu_t)^2\right)^{1/2}$$

in which $\sigma_{rt}$ represents the sample cross correlation of r and t, $$\sigma_{rt} = \frac{1}{N-1}\sum_{i=1}^{N}(r_i - \mu_r)(t_i - \mu_t)$$

in which $C_1$, $C_2$ and $C_3$ comprise relatively small positive constants, which avoid numerical instability near zero sample means.

An embodiment sets the default values as $\alpha=\beta=\gamma=1$, such that $$Q(r,t) = l(r,t) \cdot c(r,t) \cdot s(r,t)$$

$$= \left(\frac{2\mu_r\mu_t + C_1}{\mu_r^2 + \mu_t^2 + C_1}\right) \cdot \left(\frac{2\sigma_r\sigma_t + C_2}{\sigma_r^2 + \sigma_t^2 + C_2}\right) \cdot \left(\frac{\sigma_{rt} + C_3}{\sigma_r\sigma_t + C_3}\right).$$

An embodiment may thus assess visual quality on a pixel level, block level and/or an image level. In an embodiment, blocks may be over-lapped or non-overlapped. For each pixel, block or image, an embodiment assigns a numerical value between [0, 1] to Q(r,t), in which a higher number indicates a better match between the reference signal and the target signal. When the assessment is done on a pixel or block level, an embodiment assigns an overall numerical value AQ in relation to a quality characteristic of the whole image or frame, which may combine a quality assessment of each individual block of the image or frame, as for example in Equation 4, below.

$$AQ = \frac{1}{M}\sum_{j=1}^{M} Q(r_j, t_j) \qquad (4)$$

In Equation 4, the expression M represents the number of blocks $(r_j, t_j)$ of the image/frame.

The approach used in this embodiment is applied over a luminance related channel. However, an embodiment may also apply a similar approach over channels related to other image characteristics, such as chrominance, chroma or other color related attributes. To assess image quality over multiple channels, an embodiment obtains an individual value associated with each of the channels. The values obtained may be further processed to obtain a single overall value for the whole image or frame. For example, an embodiment may process the values obtained with a simple averaging computation, run over the values that are obtained for each of the individual channels.

An embodiment assesses a visual difference between video signals. The video signals are initially divided into a sequence of frames, slices or fields. The approach described above, e.g., with reference to Equation 4, is applied to each frame, slice or field and a numerical value is obtained for each of them. An embodiment further processes the values for all frames, slices and fields to obtain a single overall value for the whole video sequence. For example, an embodiment may process the values obtained with a simple averaging computation, run over the values that are obtained for each individual frame, slice or field.

An embodiment visualizes assessment results with quantizing the assessment result values, which range between [0, 1], to an L-bit uniform representation, in which $2^L-1$ in the L-bit representation corresponds to 1 in the assessment result, and in which 0 in the L-bit representation corresponds to 0 in the assessment result. The quantized results may be arranged in the same spatial location as the original pixel or block and output as an L-bit image.

Figure 9A:
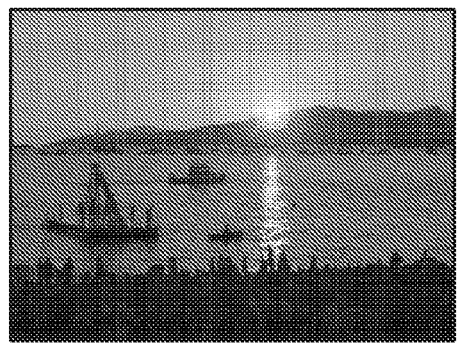
FIG. 9A, FIG. 9B, FIG. 10A, FIG. 10B, FIG. 11A and FIG. 11B depict example comparisons of test sequence images, made according to an embodiment of the present invention.
Figure 9B:
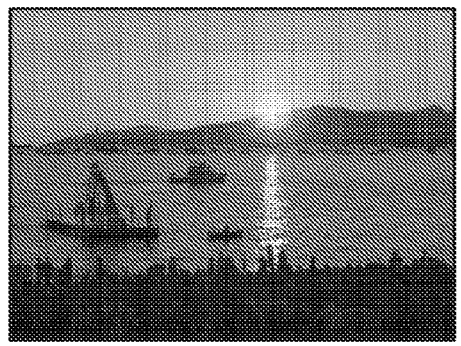

A variety of test images and test sequences are familiar to artisans skilled in fields that relate to video, imaging, photography, cinema and the like, and are used in various efforts (e.g., endeavors, tests, experiments, demonstrations, depictions and descriptions) to present uniform spatial visual information, such as for comparisons between different techniques or approaches. Two familiar test sequences, which are sometimes used to uniformly present spatial visual information, include the sequences that are commonly referred to (e.g., well known as in the related fields) as "Sunset" and "Desert to Sea." FIG. 9A, FIG. 9B, FIG. 10A, FIG. 10B, FIG. 11A and FIG. 11B depict example comparisons of test sequence images. FIG. 9A and FIG. 9B depict example adjacent (e.g., temporally or ordinally sequential) images (e.g., frames) 901 and 902 of an example test sequence portion, taken from the Sunset test sequence.

Figure 9C:
FIG. 9C, FIG. 9D, FIG. 10C, FIG. 10D, FIG. 11C, and FIG. 11D depict example quality assessment difference maps, made according to embodiments of the present invention.
Figure 9D:
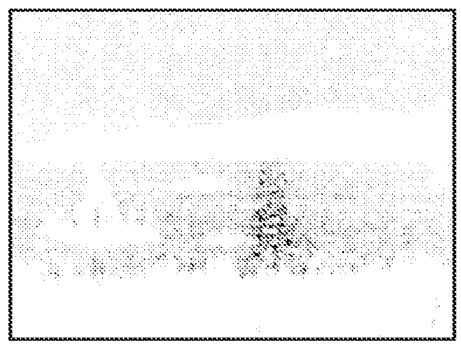

Visual quality assessment results may be output, stored and/or displayed as a difference map, e.g., a map of values that are associated with visible differences between two or more images in an image sequence. For example, a difference map may be computed, which shows the differences between two ordinally adjacent images in a sequence of images, such as two temporally adjacent frames in a video signal. FIG. 9C, FIG. 9D, FIG. 10C, FIG. 10D, FIG. 11C and FIG. 11D depict example comparisons of difference maps. FIG. 9C and FIG. 9D depict respectively distinct example visual quality assessment difference maps associated with the first frame 901 and the second frame 902 in the Sunset test sequence. In FIG. 9C, difference map 905 depicts an example HDR VDP based visual quality assessment difference map between the first frame 901 and the second frame 902. For comparison, FIG. 9D, difference map 906 depicts an example visual quality assessment difference map, which is generated according to an embodiment.

Both the example Sunset test sequence that is depicted in FIG. 9A and FIG. 9B, and the Desert to Sea test sequence (which is described below in relation to FIG. 10A, 10B) have visible details that appear in a relatively very bright area, as well as details that appear in a relatively very dark area, appearing in the same image. As described above, an embodiment visualizes assessment results with quantizing of the assessment result values, which range between [0, 1], to an L-bit uniform representation. The value $2^L-1$ in the L-bit representation corresponds to 1 in the assessment result, and the value 0 in the L-bit representation corresponds to 0 in the assessment result. The quantized results may be arranged in the same spatial location as the original pixel or block and output as an L-bit image.

In FIG. 9D, difference map 906 is marked according to a visualization technique computed according to an embodiment, in which the value of L=8. In FIG. 9C for an example comparison, difference map 905 is marked according to an HDR VDP technique. For each pixel (e.g., of images 901 and 902), HDR VDP computes a value p, which corresponds to the probability that the reference signal and the target signal differ at those pixel. The value 1−0.5*p, which is between [0.5, 1], is uniformly quantized to [128, 255], wherein the value 255 corresponds to p=0 and the value 128 corresponds to p=1.

Results of the HDR VDP test shown in FIG. 9C and results of the test shown in FIG. 9D according to an embodiment are not aligned numerically because the values respectively associated with each do not have the same meaning or definition. While the numerical results of these visual assessment tests may thus not be directly comparable, in both difference map 905 and difference map 906, darker appearing areas in the difference maps indicate a more significant or more obvious visual difference between the reference signal and the target signal than the lighter appearing areas. Conversely, the lighter appearing areas indicate a less significant (or less obvious) visual difference between the reference signal and the target signal.

Example images 901 and 902 respectively comprise the first original frame and the second original frame in the Sunset test sequence. Image 901 and image 902 each cover about five or six orders of magnitude in dynamic range, e.g., related to their brightness related values. The extent of their dynamic range ranges from a bright area (which depicts the sun, essentially at a center position) to a dim area (which depicts what appears to be a crowd of people). Image 901 and image 902 have contrast details at both the high end and the low end of their respective dynamic ranges. (It should be noted however that, due to dynamic range and color related restrictions associated with storage, rendering and printing of FIG. 9A and FIG. 9B in the instant Application, only a part of the dynamic range that exists in each of HDR image 901 and HDR image 902 may be rendered therewith using gray scale, in which both images 901 and 902 show the same portion of the available dynamic range scale.)

The visual quality assessment test maps 905 and 906, respectively depicted in FIG. 9C and FIG. 9D both/each highlight an area of high reflectance (seen on the depicted sea features in both images 901 and 902) as of relatively low visual quality. This highlighting is perhaps most apparent in association with the area in each of images 901 and 902 that show direct reflectance. In areas of images 901 and 902 that have less significant differences (and/or areas without differences), assessment results computed according to an embodiment correlate well with assessment results computed with conventional HDR VDP techniques. With such high correlations, embodiments of the present invention achieve an accuracy comparable to those associated with visual assessment results achieved with conventional HDR VDP, which are well accepted and used by artisans skilled in fields relating to images, video, cinema, photography, color, colorimetrics, and the like.

However, significant or notable latency may be associated with conventional HDR VDP computations. VDP measurements model the human visual system (e.g., incompletely). Moreover, VDP extensions to HDR involve even more complicated modeling, which take into account some human visual perception behaviors. These add models add significant complexity to the HDR VDP quality assessment. An embodiment may perform visual quality assessment independent of such perceptual modeling, and may thus function with less latency than HDR VDP approaches.

An embodiment computes a visual quality assessment independent of (e.g., without) a complex (and/or incomplete) perceptually based modeling of the HVS. An embodiment uses a relatively simple model that may be similar to a photographic technique. An embodiment maps HDR/VDR signals into a representative space or set of dimensions in which visual quality assessment may be measured more simply than with perceptual based approaches. In similar test environments, an embodiment assesses visual quality results with a significant reduction in latency, in relation to perceptual based models, such as HDR VDP.

Embodiments assess visual quality results with significantly less latency than may be achieved with conventional HDR VDP or other perceptual based approaches. For example, an embodiment may be implemented that assesses visual quality between one and two orders of magnitude (e.g., approx. 50 times) faster than HDR VDP. Moreover, an embodiment may be characterized with a modular structure, which is simple and efficient in comparison to some implementations of perceptual based assessment systems. Software and hardware implementations of an embodiment may thus be open to further (e.g., newly developing) optimizations.

In FIG. 10, assessment results are depicted over a pair of adjacent, or temporally and/or ordinally sequential, original frames 1001 and 1002 in the 'Desert to Sea' test sequence. Frame 1001 and frame 102 each/both include details in the brighter area (near the depicted sun feature) and details in the dimmer area (depicting flowers). The Desert to Sea test clip was captured with a professional quality camera and processed in professional level post production facilities. As used herein the term "professional" may relate to a level of quality, complexity, capability, know-how and/or skill that may be used by or associated with artisans of ordinary skill in fields relating to images, video, color, colorimetrics, photography, cinematography or the like.

Assessing visual quality of image content such as frames 1001 and 1002 of the Desert to Sea (and/or frames 901 and 902 of the Sunset) test sequence according to an embodiment allows for optimizable and/or low latency benchmarking and monitoring the quality of cameras and other devices used to capture the images therein. Frames 1001 and 1002 each cover about 5-6 orders of magnitude. (It should be noted however that, due to dynamic range and color related restrictions associated with storage, rendering and printing of FIG. 10A and FIG. 10B in the instant Application, only a part of the dynamic range that exists in each of HDR image 1001 and HDR image 1002 may be rendered therewith using gray scale, in which both images 1001 and 1002 show the same portion of the available dynamic range scale.)

Figure 10A:
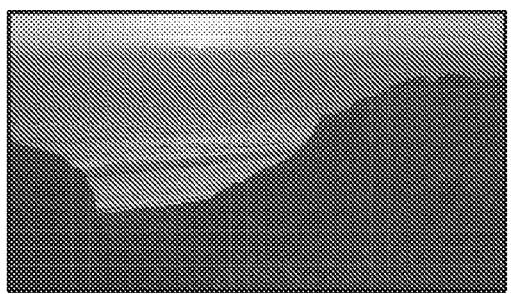
Figure 10B:
Figure 10C:
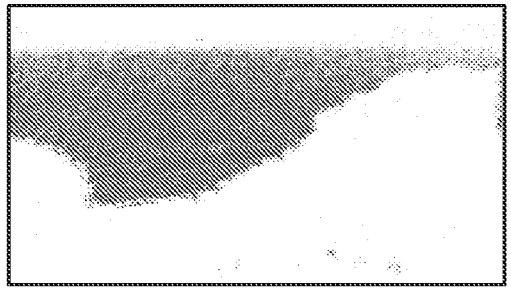
Figure 10D:
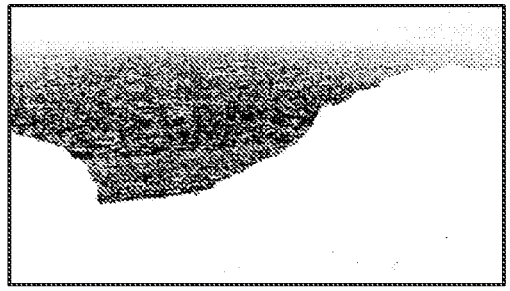

The differences between image 1001 and image 1002 and shown in FIG. 10D, as marked according to an embodiment. For an example comparison, the differences between image 1001 and image 1002 are shown in difference map 1005, as marked by a conventional HDR VDP approach. Difference maps 1001 and 1002 closely correspond in identifying areas in each of frames 1001 and 1002 that have differences of high significance and low (or zero) difference. Thus, an embodiment may assess visual quality at least about as accurately as the well established and widely used perceptually based approaches such as HDR VDP.

Moreover, in most cases and under similar test environments, an embodiment computes a visual quality assessment with significantly less latency than conventional perception based approaches. For example, while computed under similar test conditions, an embodiment generated difference map 1006 with about two full orders of magnitude less latency than a commonly used HDR VDP technique generated difference map 1005. In the implementation shown in relation to difference map 1006, an embodiment functions about 100 times faster than the HDR VDP approach that was used, which is shown in relation to difference map 1005 for comparison.

Figure 11A:
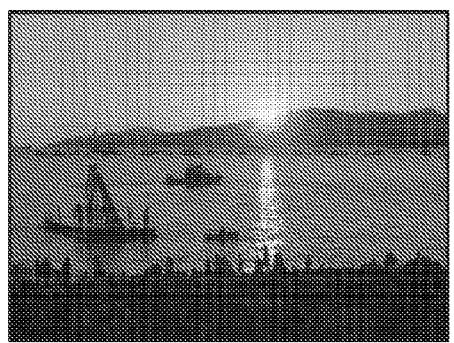
Figure 11B:
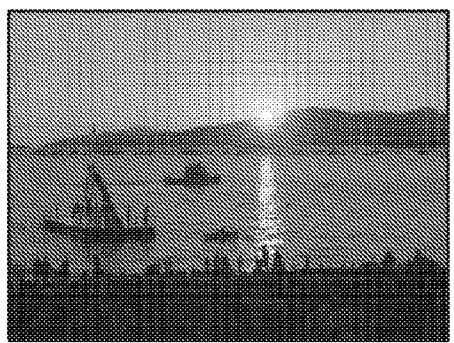
Figure 11C:
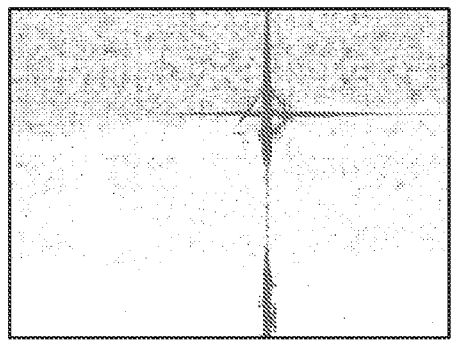
Figure 11D:
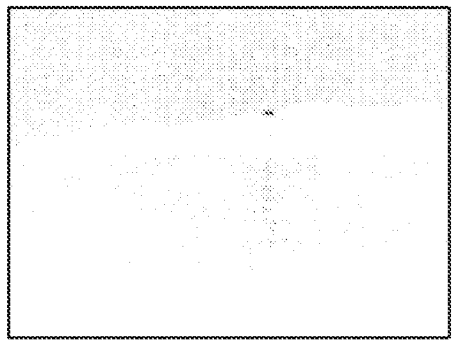

FIG. 11A and FIG. 11B depict example images, both from the Sunset test sequence. FIG. 11A depicts an original image 1101 from the Sunset test sequence. FIG. 11B depicts an image instance 1102 from the Sunset test sequence. To generate image instance 1102, the original image 1101 was first encoded in a compressed VDR format, and then subsequently decoded into decompressed VDR image 1102 from the compressed encoded instance of the original image 1101. FIG. 11C and FIG. 11D depict example difference maps between original image 1101 and the compressed and decompressed encoded image instances 1102. FIG. 11C depicts a difference map 1105, which was generated with HDR VDP. FIG. 11D depicts a difference map 1106, which was generated according to an embodiment.

The visual quality assessment test maps 1105 and 1106, respectively depicted in FIG. 11C and FIG. 11D, both/each highlight an area of high reflectance (seen on the depicted sea features in both images 1101 and 1102) as of relatively low visual quality. This highlighting is perhaps most apparent in association with the area in each of images 1101 and 1102 that show direct reflectance. In areas of images 1101 and 1102 that have less significant differences (and/or areas without differences), assessment results computed according to an embodiment also correlate well with assessment results computed with conventional HDR VDP techniques. With such high correlations, embodiments of the present invention achieve an accuracy that is comparable to those associated with visual assessment results achieved with conventional HDR VDP.

Difference maps 1105 and 1106 closely correspond in identifying areas in each of frames 1101 and 1102 that have differences of high significance and low (or zero) difference. Thus again, an embodiment may assess visual quality at least about as accurately as the well established and widely used perceptually based approaches. An embodiment computed difference map 1106 about 50 tines faster that difference map 1105 was computed with HDR VDP. The significant latency reduction in assessing visual quality according to an embodiment in comparison to perceptual based approaches promotes optimization in processes such as image and video algorithms, in which hundreds or thousands of measurements may be used in encoding or processing each image or video frame. Thus, an embodiment may be useful in implementing a video encoder.

Figure 12:
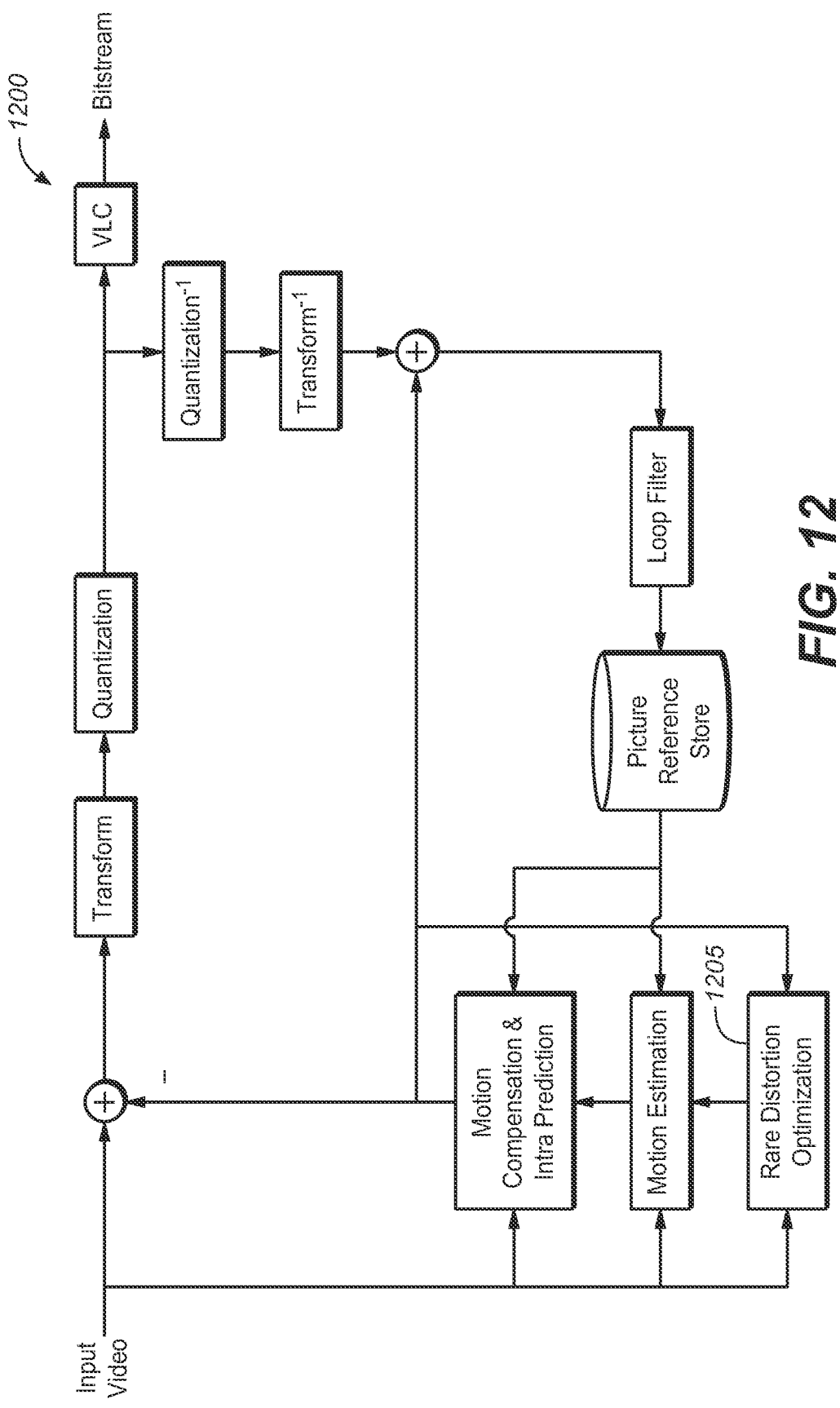
FIG. 12 depicts an example video encoding system, with which an embodiment of the present invention may be used.

FIG. 12 depicts an example video encoding system 1200, with which an embodiment of the present invention may be used. Video encoder 1200 includes a rate/distortion optimization module 1205. An embodiment may be implemented with rate/distortion optimizer 1205. An embodiment computes a visual difference D over one or more of a pixel, block or frame level, between an encoded signal (e.g., a target signal) and a original signal (reference signal). An embodiment also computes a bit rate R for encoding a target area. An embodiment computes an overall rate distortion cost function C according to Equation 5, below.

$$C = R + \lambda \cdot D \tag{5}$$

In Equation 5, the term λ represents a coefficient, such as a Lagrangian cost optimator for example, which balances a tradeoff between the bit rate and a targeted distortion parameter. An embodiment evaluates the rate distortion cost function computations for each possible encoding mode. In an embodiment, rate/distortion optimizer 1205 selects the encoding mode that is evaluated to have the smallest rate distortion cost function.

EQUIVALENTS, EXTENSIONS, ALTERNATIVES
AND MISCELLANEOUS

Example embodiments of quality assessment of high dynamic range, visual dynamic range, and wide color gamut image and video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for determining a visual quality characteristic, comprising:
    accessing a first high dynamic range (HDR) or visual dynamic range (VDR) image signal and a second HDR or VDR image signal;
    processing the accessed first and second HDR or VDR image signals without using human visual system (HVS) modeling, wherein the processing comprises:
        transforming the first HDR or VDR image signal to generate a first transformed image signal in an HDR or VDR compatible color space;
        transforming the second HDR or VDR image signal to generate a second transformed image signal in the HDR or VDR compatible color space; and
        scaling the first transformed image signal and the second transformed image signal using a non-linear photographic mapping to generate a first scaled image signal and a second scaled image signal; and
    measuring a difference between the first scaled image signal and the second scaled image signal to determine a visual quality characteristic, the visual quality characteristic relating to a magnitude of the measured difference between the first scaled image signal and the second scaled image signal.

2. The method of claim 1, wherein the HDR or VDR compatible color space includes at least one of an extended color gamut or a wide color gamut (WCG).

3. The method of claim 1, wherein the HVS model includes a linear perceptual model.

4. The method of claim 1, further comprising reporting the measured difference between the first scaled image signal and the second scaled image signal.

5. The method of claim 4, wherein the reporting step comprises the step of outputting the visual quality characteristic relating to the magnitude of the measured difference between the first scaled image signal and the second scaled image signal.

6. The method of claim 4, wherein the measured difference includes:
numerical data related to the measured difference between the first scaled image signal and the second scaled image signal; or
a map representing the measured difference between the first scaled image signal and the second scaled image signal.

7. The method of claim 6, wherein the map includes a map in a graphical format.

8. The method of claim 6, further comprising:
marking the measured difference between the first scaled image signal and the second scaled image signal.

9. The method of claim 1,
wherein transforming the first HDR or VDR image signal to generate a first transformed image signal in an HDR or VDR compatible color space includes converting a first plurality of non-linear values that are associated with a dynamic range of the first HDR or VDR image signal to a second plurality of essentially linear values; and
wherein scaling the first transformed image signal includes scaling the second plurality of essentially linear values with a non-linear scaling factor that corresponds to a perceptual non-uniformity associated with the converting step.

10. The method of claim 9, wherein the first plurality of non-linear values includes values associated with a gamma encoded RGB signal and wherein transforming the first HDR or VDR image signal to generate a first transformed image signal in an HDR or VDR compatible color space includes reversing the gamma encoded RGB signal.

11. The method of claim 8, wherein scaling the first transformed image signal and the second transformed image signal includes scaling one or more of brightness related component of the first transformed image signal and the second transformed image signal.

12. The method of claim 1, wherein measuring the difference between the first scaled image signal and the second scaled image signal includes measuring a structural similarity index value.

13. The method of claim 12, wherein measuring the structural similarity index value comprises:
comparing a value that relates to an intensity difference between the first scaled image signal and the second scaled image signal;
comparing a value that relates to a contrast difference between the first scaled image signal and the second scaled image signal; and
comparing a value that relates to a structure difference between the first scaled image signal and the second scaled image signal.

14. The method of claim 1, wherein measuring a difference between the first scaled image signal and the second scaled image signal includes measuring the difference between the first scaled image signal and the second scaled image signal on a pixel level.

15. The method of claim 1, wherein measuring a difference between the first scaled image signal and the second scaled image signal includes measuring the difference between the first scaled image signal and the second scaled image signal on a block level.

16. The method of claim 1, wherein measuring a difference between the first scaled image signal and the second scaled image signal includes measuring the difference between the first scaled image signal and the second scaled image signal on an image level.

17. The method of claim 1, wherein the first HDR or VDR image signal includes a signal encoding a first frame of a video signal, and wherein the second HDR or VDR image signal includes a signal encoding a subsequent frame of the video signal.

18. A non-transitory computer-readable medium storing software having stored thereon instructions, which, when executed by one or more computers, cause the one or more computers to perform operations of:
accessing a first high dynamic range (HDR) or visual dynamic range (VDR) image signal and a second HDR or VDR image signal;
processing the accessed first and second HDR or VDR image signals without using human visual system (HVS) modeling, wherein the processing comprises:
transforming the first HDR or VDR image signal to generate a first transformed image signal in an HDR or VDR compatible color space;
transforming the second HDR or VDR image signal to generate a second transformed image signal in the HDR or VDR compatible color space; and
scaling the first transformed image signal and the second transformed image signal using a non-linear photographic mapping to generate a first scaled image signal and a second scaled image signal; and
measuring a difference between the first scaled image signal and the second scaled image signal to determine a visual quality characteristic, the visual quality characteristic relating to a magnitude of the measured difference between the first scaled image signal and the second scaled image signal.

19. The computer-readable medium of claim 18, wherein the HDR or VDR compatible color space includes at least one of an extended color gamut or a wide color gamut (WCG).

20. The computer-readable medium of claim 18, wherein the measured difference includes:
numerical data related to the measured difference between the first scaled image signal and the second scaled image signal; or
a map representing the measured difference between the first scaled image signal and the second scaled image signal.

21. The computer-readable medium of claim 18,
wherein transforming the first HDR or VDR image signal to generate a first transformed image signal in an HDR or VDR compatible color space includes converting a first plurality of non-linear values that are associated with a dynamic range of the first HDR or VDR image signal to a second plurality of essentially linear values, and
wherein scaling the first transformed image signal includes scaling the second plurality of essentially linear values with a non-linear scaling factor that corresponds to a perceptual non-uniformity associated with the converting step.

22. The computer-readable medium of claim 18, wherein scaling the first transformed image signal and the second transformed image signal includes scaling one or more of brightness related component of the first transformed image signal and the second transformed image signal.

23. The computer-readable medium of claim 18, wherein the first HDR or VDR image signal includes a signal encoding a first frame of a video signal, and wherein the second HDR or VDR image signal includes a signal encoding a subsequent frame of the video signal.

24. A system comprising:
one or more processors and one or more computer storage media storing instructions that are operable, when executed by the one or more processors, to cause the one or more processors to perform operations comprising:
accessing a first high dynamic range (HDR) or visual dynamic range (VDR) image signal and a second HDR or VDR image signal;
processing the accessed first and second HDR or VDR image signals without using human visual system (HVS) modeling, wherein the processing comprises:
transforming the first HDR or VDR image signal to generate a first transformed image signal in an HDR or VDR compatible color space;
transforming the second HDR or VDR image signal to generate a second transformed image signal in the HDR or VDR compatible color space; and
scaling the first transformed image signal and the second transformed image signal using a non-linear photographic mapping to generate a first scaled image signal and a second scaled image signal; and
measuring a difference between the first scaled image signal and the second scaled image signal to determine a visual quality characteristic, the visual quality characteristic relating to a magnitude of the measured difference between the first scaled image signal and the second scaled image signal.

25. The system of claim 24, wherein the HDR or VDR compatible color space includes at least one of an extended color gamut or a wide color gamut (WCG).

26. The system of claim 24, wherein the measured difference includes:
numerical data related to the measured difference between the first scaled image signal and the second scaled image signal; or
a map representing the measured difference between the first scaled image signal and the second scaled image signal.

27. The system of claim 24,
wherein transforming the first HDR or VDR image signal to generate a first transformed image signal in an HDR or VDR compatible color space includes converting a first plurality of non-linear values that are associated with a dynamic range of the first HDR or VDR image signal to a second plurality of essentially linear values, and
wherein scaling the first transformed image signal includes scaling the second plurality of essentially linear values with a non-linear scaling factor that corresponds to a perceptual non-uniformity associated with the converting step.

28. The system of claim 24, wherein scaling the first transformed image signal and the second transformed image signal includes scaling one or more of brightness related component of the first transformed image signal and the second transformed image signal.

29. The system of claim 24, wherein the first HDR or VDR image signal includes a signal encoding a first frame of a video signal, and wherein the second HDR or VDR image signal includes a signal encoding a subsequent frame of the video signal.

* * * * *